United States Patent
Rahman

(10) Patent No.: US 11,115,800 B2
(45) Date of Patent: Sep. 7, 2021

(54) COMMUNICATION MANAGEMENT FOR CORE NETWORK

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/026,834

(22) Filed: Jul. 3, 2018

(65) Prior Publication Data

US 2018/0317082 A1    Nov. 1, 2018

Related U.S. Application Data

(63) Continuation of application No. 15/296,992, filed on Oct. 18, 2016, now Pat. No. 10,045,200.

(51) Int. Cl.
| | |
|---|---|
| *H04W 4/00* | (2018.01) |
| *H04W 8/08* | (2009.01) |
| *H04W 40/20* | (2009.01) |
| *H04W 8/02* | (2009.01) |
| *H04W 8/20* | (2009.01) |
| *H04W 64/00* | (2009.01) |
| *H04W 8/12* | (2009.01) |

(52) U.S. Cl.
CPC .............. *H04W 8/08* (2013.01); *H04W 8/02* (2013.01); *H04W 8/20* (2013.01); *H04W 40/20* (2013.01); *H04W 64/00* (2013.01); *H04W 8/12* (2013.01); *H04W 64/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,975,604 | B1 * | 12/2005 | Ishida | H04L 1/0002 370/331 |
| 10,045,200 | B2 | 8/2018 | Rahman | |
| 2001/0034232 | A1 * | 10/2001 | Kuwahara | H04W 60/04 455/435.1 |
| 2001/0055298 | A1 * | 12/2001 | Baker | H04M 15/00 370/349 |
| 2004/0001439 | A1 * | 1/2004 | Jones | H04W 28/08 370/235 |
| 2007/0270149 | A1 * | 11/2007 | Yanagihara | H04W 36/30 455/436 |
| 2018/0041926 | A1 * | 2/2018 | Zhang | H04W 36/22 |

\* cited by examiner

*Primary Examiner* — Justin Y Lee
(74) *Attorney, Agent, or Firm* — Knobbe, Martens, Olson & Bear, LLP

(57) ABSTRACT

Systems and methods for managing communications among a central entity and multiple local entities in a telecommunication core network are disclosed. Localized central entities may be established across the core network based on localization patterns of telecommunication devices. The localized central entities may duplicate a portion of central entity data and provide local entities more efficient access to the data.

22 Claims, 4 Drawing Sheets

COMMUNICATION MANAGEMENT FOR CORE NETWORK

CROSS-REFERENCE TO RELATED APPLICATION

This application is a continuation of U.S. patent application Ser. No. 15/296,992, entitled COMMUNICATION MANAGEMENT FOR CORE NETWORK and filed on Oct. 18, 2016, the disclosure of which is incorporated herein by reference.

BACKGROUND

A core network (also known as network core or backbone network) is the central part of a telecommunications network that provides various services to telecommunication devices, often referred to as user equipment ("UE"), that are connected by access network(s) of the telecommunications network. Typically, a core network includes high capacity communication facilities that connect primary nodes, and provides paths for the exchange of information between different sub-networks.

Nodes in a core network may include network components (e.g., switches and routers) that are capable of receiving, sending, or forwarding electronic information over communication links. Physically, one or more of core network functionalities (e.g., authentication, call control/switching, service invocation, accounting, or the like) may simultaneously be implemented in a given core network node. Certain core network nodes may be associated with central entities, such as a central database that contains details of each telecommunication device subscriber that is authorized to use the core network (e.g., the home location register (HLR) in GSM networks, home subscriber server (HSS) or user profile server function (UPSF) in IMS networks, or the like). The central entity may communicate with nodes associated with multiple local entities (e.g., visitor location registers (VLRs), serving GPRS support nodes (SGSNs), mobility management entities (MMEs), or the like) distributed across the core network to manage and provide services to various telecommunication devices.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
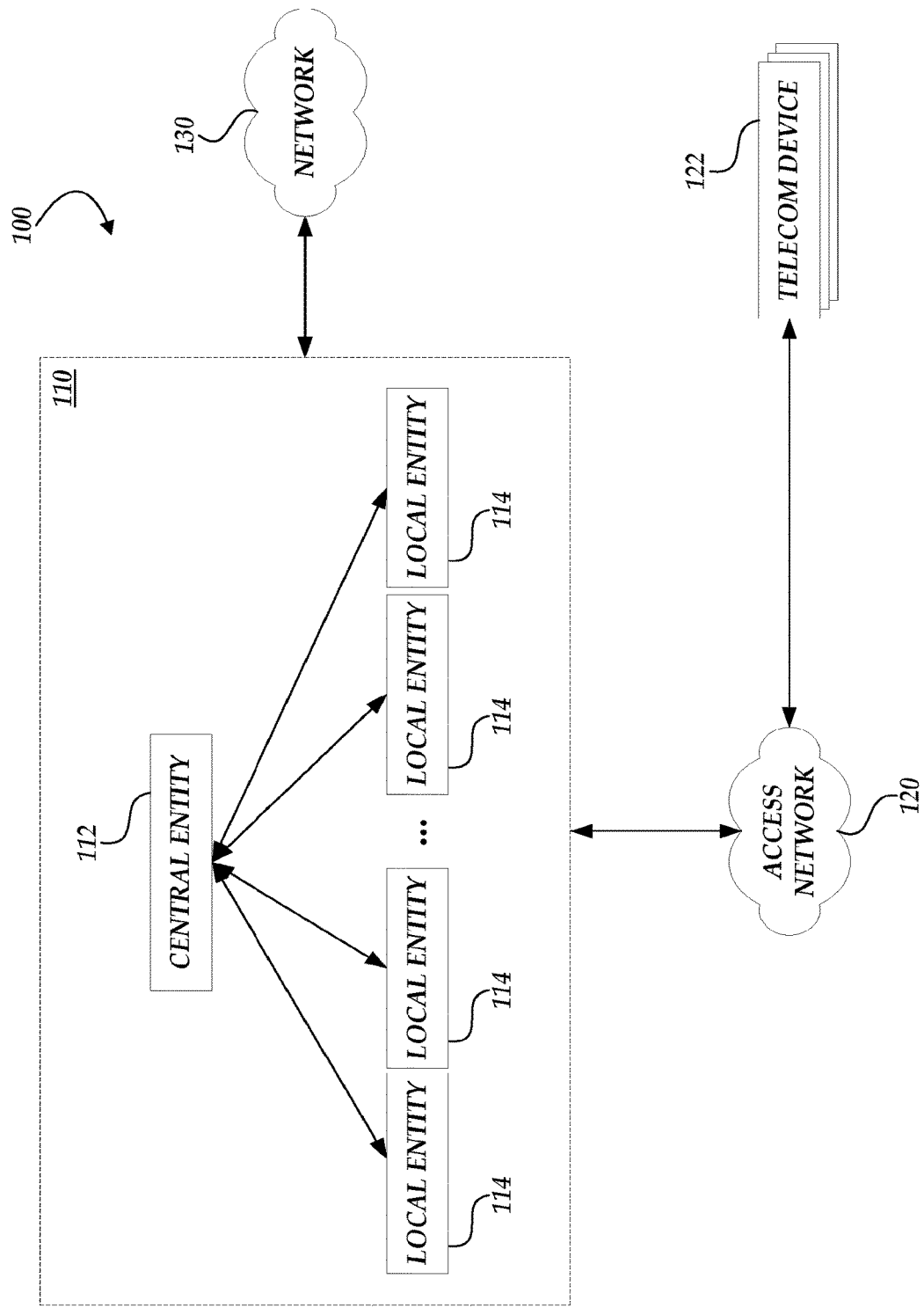
FIG. 1 is a block diagram depicting an illustrative telecommunication environment.

Generally described the present disclosure relates to the management of communications among central entities and local entities in a core network of a telecommunications network. More specifically, aspects of the present application correspond to the establishment of localized central entities that maintain a portion of central entity data and provide efficient communications with local entities in accordance with mobility patterns of telecommunication devices associated with the telecommunications network.

A core network, network core, or backbone network, is the central part of a telecommunications network that provides various services to telecommunication devices connected by access networks. One of the main functions of the core network is to route telephone calls, messages, or other data across a public switched telephone network (PSTN) or IP Multimedia Subsystem (IMS). The core network may provide high capacity communication facilities that connect various nodes, allowing the nodes to exchange information via various paths.

Certain core network nodes may be associated with central entities, such as a single central database that contains details of each telecommunication device subscriber that is authorized to use the core network (e.g., the home location register (HLR) in GSM networks, home subscriber server (HSS) or user profile server function (UPSF) in IMS networks, or the like). The central entity may communicate with nodes associated with various local entities (e.g., visitor location register (VLR), serving GPRS support node (SGSN), mobility management entity (MME), or the like) within the core network to manage and provide services (e.g., authentication, service invocation, or the like) to various telecommunication devices. Each distinct type of local entities may be distributed in multiple entities across the entire core network or some portion thereof, depending on corresponding functionality, traffic pattern, or network topology.

Illustratively, a central entity, such as an HLR, may be physically located in a centralized location mostly driven by geographical optimum selection based on network traffic concentration and pattern. The HLR maintains the record of all the provisioned subscriber data, subscribers subscription details, supplementary service data, present location information, or data related to telecommunication devices subscribed to or otherwise associated with the telecommunications network (generally referred to as "mobile subscribers"). The HLR also maintains the present addresses of various local entities that serve mobile subscribes. Accordingly, the HLR interacts with the local entities, such as mobile switching center (MSC), visiting location register (VLR), serving GPRS support node (SGSN), mobility management entity (MME), or the like, that are more locally diverse and distributed across the core network.

Because of the mobility nature of mobile subscribers, an enormous amount of traffic may constantly occur between the central entity (e.g., HLR) and multiple local entities (e.g., MSCs, VLRs, SGSNs, MMES) of various types. This allows the central entity to remain informed and updated about the present location information of mobile subscribers in the telecommunications network so that such information can be used to properly initiate or terminate voice calls, data sessions, delivering short message service (SMS), multimedia messaging service (MMS) and other telecommunications network services.

Geographically, not many mobile subscribers frequently travel among locations (e.g., another state or city) that are relatively far from one another. A majority of mobile subscribers may be on the move from time to time, however they largely remain within a relatively small and stable geographic area (e.g., a same city or county). The mobility patterns of mobile subscribers may be utilized to establish localized central entities in the core network that maintain portions of central entity data for "local" mobile subscribers.

The localized central entities may be located on nodes closer (in terms of geographic distance or network topology) to corresponding local entities thus providing them faster and more efficient access. Therefore, local entities may no longer need to interact with the central entity for a substantial amount of data related to "local" mobile subscribers associated with the local entities. Accordingly, number of transactions and other overhead associated with the communications between central and local entities can be greatly reduced.

Although aspects of the present disclosure will be described with regard to an illustrative telecommunications environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, a mobile device, or a computing device. Accordingly, reference to a telecommunication device should not be interpreted as including any particular functionality or operation not described in the present disclosure. Still further, although the present disclosure is described with regard to specific methodologies and frameworks for data requesting, retrieval, collection, or updating, the present disclosure should not be construed to require combination of the disclosed embodiments or any specific variation unless such combination or variation is expressly identified.

With reference now to FIG. 1, a block diagram depicting an illustrative telecommunication environment 100 will be described. The telecommunication environment 100 can include a number of telecommunication devices 122, each associated with a user. The telecommunication devices 122 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like). In an illustrative embodiment, the telecommunication devices 122 include a wide variety of software and hardware components for establishing communications over one or more communication networks, including an access network 120, a core network 110, or other private or public networks such as network 130.

The telecommunication devices 122 are communicatively connected via the access network 120, such as GSM Radio Access Network (GRAN), GSM EDGE Radio Access Network (GERAN), Universal Terrestrial Radio Access Network (UTRAN), Evolved Universal Terrestrial Radio Access (E-UTRAN), or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of telecommunication devices 122 to communicate via the fixed-location transceivers. Although the access network 120 is illustrated as a single network, one skilled in the relevant art will appreciate that the access network can be include any number of public or private communication networks and/or network connections.

The telecommunication environment 100 includes the core network 100 that provides various services to telecommunication devices 122 that are connected via the access network 120. One of the main functions of the core network is to route telephone calls, messages, or other data across a public switched telephone network (PSTN) or IP Multimedia Subsystem (IMS). The core network may provide high capacity communication facilities that connect various nodes implemented on one or more computing devices, allowing the nodes to exchange information via various paths.

Certain core network nodes may be associated with central entities 112, such as a single central database that contains details of each telecommunication device subscriber that is authorized to use the core network (e.g., the home location register (HLR) in GSM networks, home subscriber server (HSS) or user profile server function (UPSF) in IMS networks, or the like). The central entity 112 may communicate with nodes associated with various local entities 114 (e.g., visitor location registers (VLRs), serving GPRS support nodes (SGSNs), mobility management entities (MMEs), or the like) within the core network to manage and provide services (e.g., authentication, service invocation, or the like) to various telecommunication devices 122.

Illustratively, a central entity 112, such as an HLR, may be physically located in a centralized location mostly driven by geographical optimum selection based on network traffic concentration and pattern. The HLR maintains the record of all the provisioned subscriber data, subscribers subscription details, supplementary service data, present location information, or other data related to mobile subscribers. The HLR also maintains the present addresses of various local entities 114 that serve mobile subscribers. Accordingly, the HLR interacts with the local entities, such as mobile switching center (MSC), visiting location register (VLR), serving GPRS support node (SGSN), mobility management entity (MME), or the like, that are more locally diverse and distributed across the core network 110 (e.g., in different cities, neighborhoods, or other distributed localities).

The core network 100 may be further connected to one or more networks 130, which may include any system for allowing multiple computing or telecommunication devices to communicate with each other. For example, the network 130 can be a Local Area Network (LAN), a Wide Area Network (WAN), a point-to-point network, a wireless network, a satellite network, a cable network, the Internet, combinations of the same, or the like.

Figure 2:
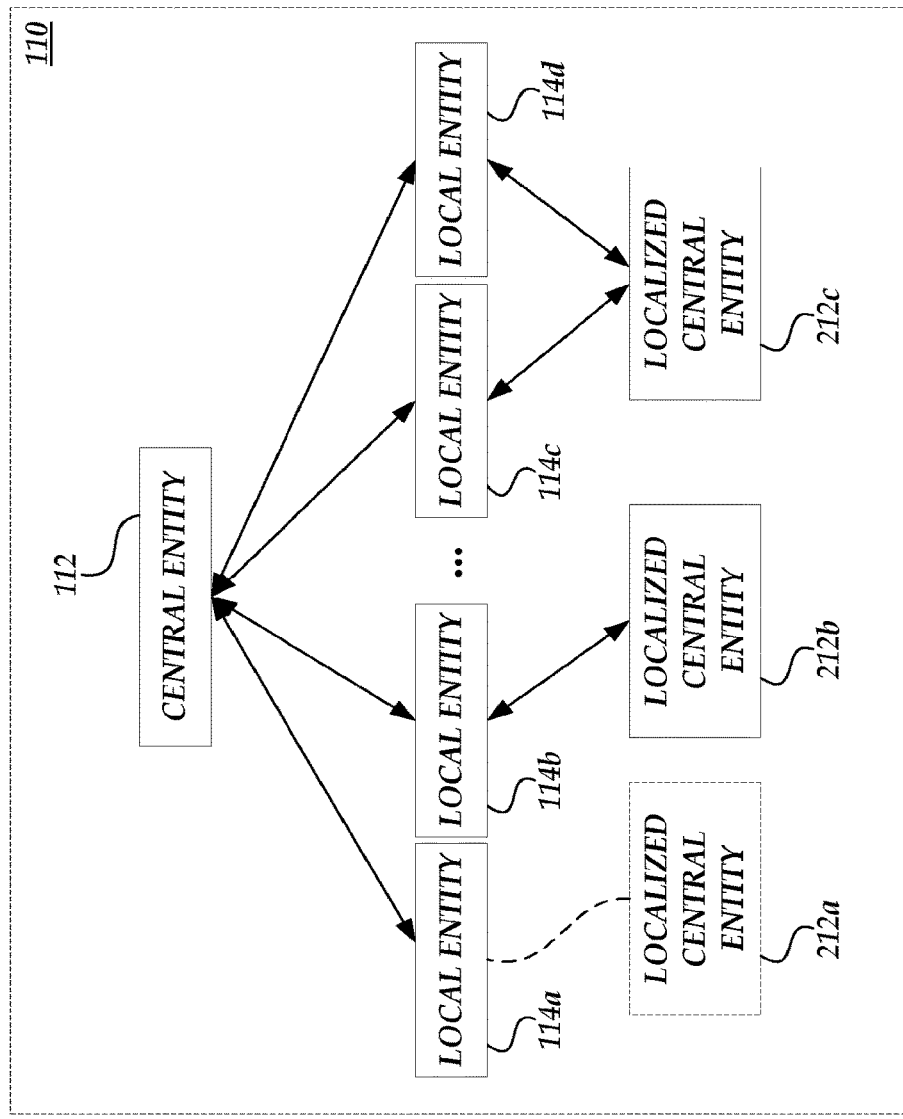
FIG. 2 is an illustrative diagram depicting a core network including localized central entities.

FIG. 2 is an illustrative diagram depicting a core network 110 including localized central entities 212. As discussed earlier, because of the mobility nature of mobile subscribers, an enormous amount of traffic may constantly occur between a central entity 112 and various local entities 114. This allows the central entity 112 to remain informed and updated about the present location information of mobile subscribers in the telecommunication environment 100 so that such information can be used to properly initiate or terminate voice calls, data sessions, delivering short message service (SMS), multimedia messaging service (MMS) and other telecommunications network services.

Geographically, not many mobile subscribers frequently travel among locations (e.g., another state or city) that are relatively far from one another. A majority of mobile subscribers may be on the move from time to time, however they largely remain within a relatively small and stable geographic area (e.g., a same city or county). The mobility patterns of mobile subscribers may be utilized to establish localized central entities 212 in the core network 110 that maintain portions of central entity data for "local" mobile subscribers. The localized central entities 212 may be located on core network nodes that are closer (in terms of geographic distance or network topology) to local entities 114 that they serve, thus providing faster and more efficient access. Therefore, local entities 114 may no longer need to interact with the central entity 112 for a substantial amount of data related to "local" mobile subscribers associated with the local entities 114, and transactions and overhead associated with the communications between central and local entities can be greatly reduced.

In some embodiments, a localized central entity 212a may be implemented on the same node(s) as a local entity 114a that it serves. In this case, the communications between local entity 114a and localized central entity 212a may not involve network-related latencies and the communication cost may be negligible. In some embodiments, a localized central entity 212b may be implemented on certain core network node(s) to exclusively serve a corresponding local entity 114b. In this case, the physical or network-based distance between the localized central entity 212b and the local entity 114b may be much smaller than the distance between the central entity 112 and the local entity 114b. Thus, the network-related latencies or other communication cost for interactions between the localized central entity 212b and the local entity 114b is much smaller. In other embodiments, a localized central entity 212c may be implemented on certain core network node(s) to serve a group of local entities 114c, 114d, or the like. In this case, the group of local entities 114 may share a same localized central entity 212c due to proximity among the local entities (e.g., within a threshold distance of one another either geographically or based on core network topology). Similarly, the localized central entity 212c may be located much closer to all of the local entities 114 in the group in terms of physical distance or network proximity, than the central entity 112 does. Thus, the network-related latencies or other communication cost for interactions between the localized central entity 212c and any local entity 114 in the group is much smaller.

Figure 3:
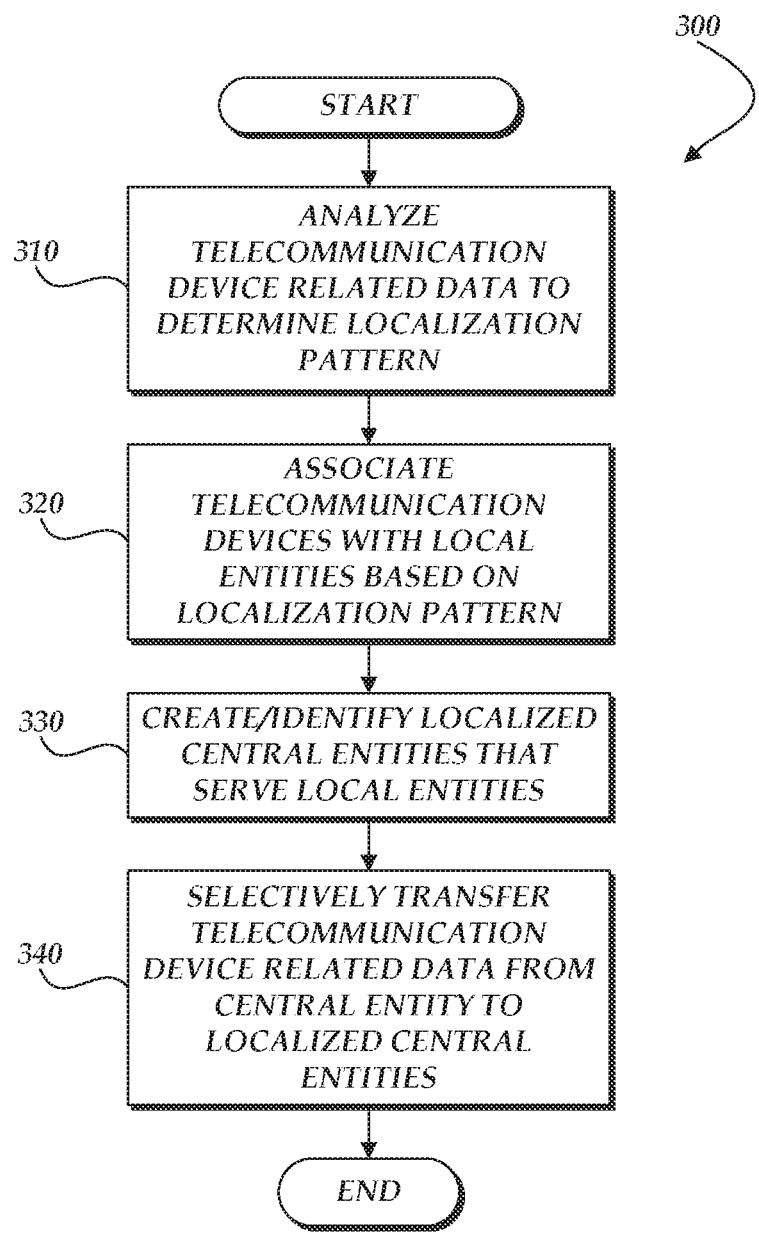
FIG. 3 is a flow diagram depicting an illustrative routine for selectively transferring data from a central entity to localized central entities.

FIG. 3 is a flow diagram depicting an illustrative routine 300 for selectively transferring data from a central entity 112 to localized central entities 212. Routine 300 may be implemented by the central entity 112 (or an associated computing device or service). At block 310, the central entity 112 analyzes telecommunication device related data to determine localization pattern of mobile subscribers. In some embodiments, the central entity 112 may analyze telecommunication device related data currently maintained by the central entity 112 and determine current geographic locations associated with mobile subscribers. In some embodiments, the central entity 112 analyzes historical telecommunication device related data to determine travel patterns associated with each mobile subscriber. For example, the central entity 112 may compute an estimated geographic location or geographic region for a mobile subscriber based on the respective durations within a specified period of time when the mobile subscriber was connecting from different locations. Various time-decay factors or other weights may be utilized in the computation. In some embodiments, the central entity 112 may further calculate a measure of geographic stability for each mobile subscriber based on the frequency and distance of movements of the corresponding telecommunication device 122 for a specified period of time (which may or may not be the same period of time used for location determination). Illustratively, higher movement frequency or longer movement distance may result in a lower measure of geographic stability.

At block 320, the central entity 122 associates telecommunication devices 122 with local entities 114 based on mobile subscriber localization pattern. In some embodiments, the central entity 122 may calculate physical or network-based distance between a local entity 114 and each telecommunication device 122 based on their actual or estimated locations. If the distance falls below a threshold, the local entity 114 may be considered associated with the telecommunication device 122. In some embodiments, the central entity 112 may filter out telecommunication devices 122 that have a relatively low measure of geographic stability (e.g., below a specified threshold value), either before or after the distance calculation. In other embodiments, the central entity 112 simply associates a telecommunication device 122 with any local entity 114 that requested, updated, or otherwise accessed central entity data related to the telecommunication device 122 most recently; the central entity 112 may alternatively associate the telecommunication device 122 with any local entity 114 that has had such access more than a threshold number of times during a specified period of time.

At block 330, the central entity 112 creates or identifies localized central entities 212 that serve local entities 114. The central entity 112 may analyze the density or quantity of telecommunication device 122 associated with each local entity 114, the computational or networking resources available at local entity nodes or other nearby nodes, or the cost for creating localized central entities 212 at specific locations, and then decide to create localized central entities 212 directly on certain local entity nodes or on other nodes that may provide relatively efficient access to one or more local entities. In some embodiments, the central entity 112 may decide to terminate previously created localized central entities 212 due to under-utilization or changes in mobile subscribe localization patterns.

In some embodiments, certain localized central entities 212 may have previously been established and the central entity 112 may select existing localized central entities 212 to serve local entities 114 based on the geographic distance or network proximity between the two. Illustratively, the central entity 112 may send network address or other identifiers of a selected localized central entity 212 to a local entity 114 and direct the local entity 114 to interact with the selected localized central entity 212. Because localized central entities 212 may be dynamically created or terminated in accordance with developments in mobile subscriber localization patterns, a local entity 114 may be served by different localized central entities 212 at different times.

At block 340, the central entity 112 selectively transfers telecommunication device related data from the central entity 112 to various localized central entities 212. Illustratively, the central entity 112 keeps track of the associations between telecommunication devices 122 and local entities 114 as well as associations between local entities 114 and localized central entities 212 that serve them. By connecting or combining these associations, the central entity 112 determines mappings between telecommunication devices 122 and localized central entities 212, selects data entries related to individual telecommunication devices 122 that are mapped to specific localized central entities 212, and transmits the selected data entries thereto. It should be noted that the data transmitted to different localized central entities 212 may or may not overlap with one another, and not all of the data entries maintained by the central entity 112 may be transmitted to a localized central entity 212.

Figure 4:
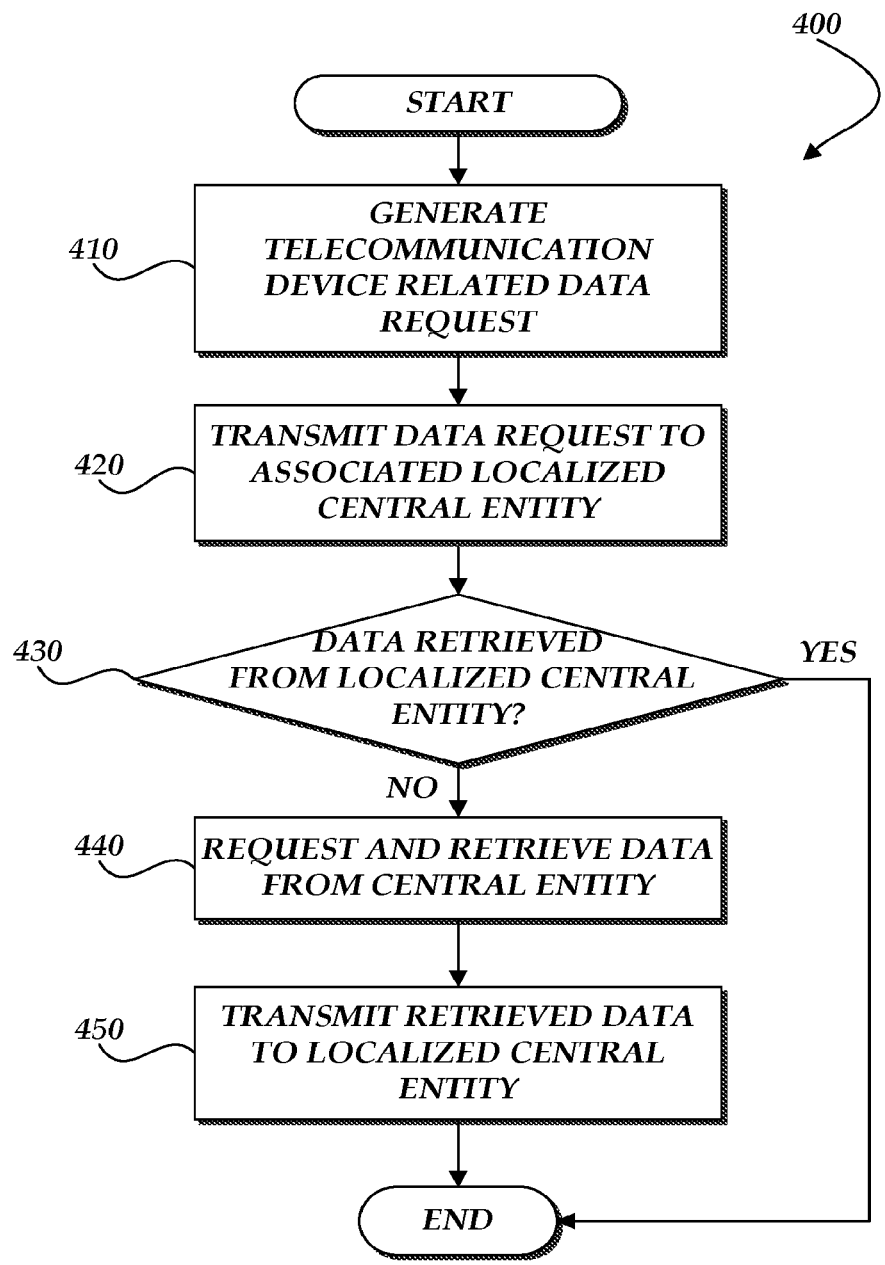
FIG. 4 is a flow diagram depicting an illustrative routine for requesting data from localized central entities.

FIG. 4 is a flow diagram depicting an illustrative routine 400 for requesting data from a localized central entity 212. Routine 400 may be implemented by a local entity 114. At block 410, the local entity 114 generates a data request related to a target telecommunication device 122. For example, the data request may correspond to a request for data about the SIM, mobile services ISDN number, or other information maintained on a central entity 112 that relates to the target telecommunication device 122.

At block 420, the local entity 114 transmits the data request to a localized central entity 212. The localized central entity 212 may store copies of at least a portion of the data maintained by the central entity 112. As discussed above, in some embodiments, the local entity 114 has previously received the network address or other identifier of the localized central entity 212 from the central entity 112 or an associated service, thus the data request can be sent or routed to the localized central entity 212 based thereon. In other embodiments, the local entity 114 may create or have established a local or dedicated localized central entity 212 independently. Such independently established localized central entities 212 may be managed or controlled by their corresponding local entity 114, and may or may not be known or accessible to the central entity 112 or other local entities 114.

At block 430, the local entity 114 determines whether the requested data is successfully retrieved from the localized central entity 212. If the requested data is available at the localized central entity 212 and successfully retrieved, the routine 400 ends. Otherwise, the routine 400 proceeds to block 440, where the local entity 114 transmits the data request to the central entity 112 and retrieves requested data.

At block 450, either the local entity 114 or the central entity 112 further transmits to the localized central entity 212 a copy of the requested data related to the target telecommunication device 122. In some embodiments, the central entity 112 transmits additional data related to the target telecommunication device 122 besides the data as requested. This ensures that the localized central entity 212 can be updated with additional or new data related to telecommunication devices 122, such as the target telecommunication device, that have recently traveled into a geographic or network jurisdiction served by the local entity 114. Subsequently, the localized central entity 212 may respond to future data requests related to the target telecommunication device or another device with such updated data.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for managing communications within a core network of a telecommunications network that provides services to telecommunication devices, the core network including nodes corresponding to a central entity and a plurality of local entities, the method comprising:
   determining localization patterns of a plurality of telecommunication devices based at least in part on analysis of data related to the plurality of telecommunication devices that utilize the core network;
   establishing, by the core network, a plurality of localized central entities on the core network based at least in part on the localization patterns, wherein each localized central entity is associated with one or more local entities that the localized central entity serves, and wherein each localized central entity is configured to maintain copies of at least a portion of data stored by the central entity; and
   transferring data maintained by the central entity and related to at least a subset of the plurality of telecommunication devices from the central entity to at least one localized central entity, wherein the at least one localized central entity receives and responds to requests from the one or more associated local entities for data related to one of the subset of telecommunication devices.

2. The computer-implemented method of claim 1, wherein the core network routes telephone calls, messages, or data across a public switched telephone network (PSTN) or IP Multimedia Subsystem (IMS).

3. The computer-implemented method of claim 1, wherein the central entity includes a central database on the core network that maintains the data related to the plurality of telecommunication devices.

4. The computer-implemented method of claim 1, wherein the central entity corresponds to a home location register (HLR) in GSM networks, a home subscriber server (HSS) in IMS networks, or a user profile server function (UPSF) in IMS networks.

5. The computer-implemented method of claim 1, wherein the data related to the plurality of telecommunication devices include at least one of provisioned subscriber data, subscriber subscription details, supplementary service data, or present location information associated with individual telecommunication devices.

6. The computer-implemented method of claim 1, wherein the plurality of local entities include at least one of a mobile switching center (MSC), a visiting location register (VLR), a serving GPRS support node (SGSN), or a mobility management entity (MME).

7. The computer-implemented method of claim 1, wherein a physical or network-based distance is smaller between the at least one localized central entity and the associated one or more local entities than between the central entity and the associated one or more local entities.

8. The computer-implemented method of claim 7, wherein the at least one localized central entity is implemented on a same node as one of the associated one or more local entities.

9. The computer-implemented method of claim 1 further comprising directing, by the at least one central entity, individual ones of the one or more local entities to communicate with individual ones of the plurality of localized central entities.

10. The computer-implemented method of claim 1, wherein establishing a plurality of localized central entities on the core network comprises dynamically creating the plurality of localized central entities.

11. The computer-implemented method of claim 1, wherein the central entity stores associations between the plurality of telecommunications devices and the plurality of local entities.

12. The computer-implemented method of claim 11, wherein the central entity stores associations between the plurality of local entities and the plurality of localized central entities.

13. The computer-implemented method of claim 1 further comprising terminating one or more localized central entities based at least in part on the localization patterns.

14. A system for managing communications within a core network of a telecommunications network that provides services to telecommunication devices, the core network including nodes corresponding to at least one central entity and a plurality of local entities, the core network comprising one or more processors on one or more nodes configured to:
   determine localization patterns of a plurality of telecommunication devices based at least in part on analysis of data related to the plurality of telecommunication devices that utilize the core network;
   establish a plurality of localized central entities on the core network based at least in part on the localization patterns, wherein each localized central entity is associated with one or more local entities that the localized central entity serves, and wherein each localized central entity is configured to maintain copies of at least a portion of data stored by the central entity; and
   transfer data maintained by the central entity and related to at least a subset of the plurality of telecommunication devices from the central entity to at least one localized central entity, wherein the at least one localized central entity receives and responds to requests from the one or more associated local entities for data related to one of the subset of telecommunication devices.

15. The system of claim 14, wherein the data related to the plurality of telecommunication devices include at least one of provisioned subscriber data, subscriber subscription details, supplementary service data, or present location information associated with individual telecommunication devices.

16. The system of claim 14, wherein the plurality of local entities include at least one of a mobile switching center (MSC), a visiting location register (VLR), a serving GPRS support node (SGSN), or a mobility management entity (MME).

17. The system of claim 14, wherein a physical or network-based distance is smaller between the at least one localized central entity and the associated one or more local entities than between the central entity and the associated one or more local entities.

18. The system of claim 17, wherein the at least one localized central entity is implemented on a same node as one of the associated one or more local entities.

19. The system of claim 14, wherein establishing a plurality of localized central entities on the core network comprises dynamically creating the plurality of localized central entities.

20. The system of claim 14, wherein the central entity stores associations between the plurality of telecommunications devices and the plurality of local entities.

21. The system of claim 20, wherein the central entity stores associations between the plurality of local entities and the plurality of localized central entities.

22. The system of claim 14, wherein the one or more processors is further configured to terminate one or more localized central entities based at least in part on the localization patterns.

* * * * *

UNITED STATES PATENT AND TRADEMARK OFFICE
CERTIFICATE OF CORRECTION

PATENT NO. : 11,115,800 B2
APPLICATION NO. : 16/026834
DATED : September 7, 2021
INVENTOR(S) : Rahman Page 1 of 1

It is certified that error appears in the above-identified patent and that said Letters Patent is hereby corrected as shown below:

In the Specification

In Column 2, Line 51, delete "MMES)" and insert --MMEs)--.

In the Claims

In Column 10, Claim 4, Lines 6-7, delete "(UP SF)" and insert --(UPSF)--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*